US 6,681,104 B1

(12) United States Patent
Scheuer et al.

(10) Patent No.: US 6,681,104 B1
(45) Date of Patent: Jan. 20, 2004

(54) BUILT-IN APPLIANCE INTENDED FOR A MOTOR VEHICLE

(75) Inventors: Wilfried Scheuer, Gladenbach (DE); Stephen Lauth, Asslar (DE)

(73) Assignee: Mannesmann VDO AG, Frankfurt am Main (DE)

( * ) Notice: Subject to any disclaimer, the term of this patent is extended or adjusted under 35 U.S.C. 154(b) by 0 days.

(21) Appl. No.: 09/561,774

(22) Filed: Apr. 29, 2000

(30) Foreign Application Priority Data

Apr. 30, 1999 (DE) .......................... 199 19 970
Aug. 6, 1999 (DE) .......................... 199 36 725

(51) Int. Cl.[7] .......................... H04B 1/06; H05K 11/02
(52) U.S. Cl. .................. 455/345; 455/344; 455/346; 455/347; 307/10.1
(58) Field of Search .................. 455/344–351, 455/186.1, 90.3, 575.1, 550.1; 307/10.1, 10.2

(56) References Cited

U.S. PATENT DOCUMENTS

| 5,222,007 | A | * | 6/1993 | Suzuki et al. ............... 360/137 |
| 5,341,434 | A | * | 8/1994 | Kawamoto .................. 381/86 |
| 5,537,673 | A | * | 7/1996 | Nagashima et al. ......... 455/346 |
| 5,575,544 | A | * | 11/1996 | Hasegawa et al. ........... 312/7.1 |
| 5,862,468 | A | * | 1/1999 | Kim ............................ 455/346 |
| 5,964,821 | A | * | 10/1999 | Brunts et al. ................ 701/201 |
| 6,377,160 | B1 | * | 4/2002 | Groeger ...................... 340/5.6 |
| 6,407,467 | B1 | * | 6/2002 | Scheuer et al. ............. 307/10.1 |

FOREIGN PATENT DOCUMENTS

| DE | 4430531 | | 8/1995 |
| DE | 19548394 | | 7/1996 |
| DE | 19624762 | | 1/1998 |
| DE | 19631591 | | 2/1998 |
| DE | 19734988 | * | 2/1999 ............ H04B/1/08 |
| FR | 2623044 | | 4/1992 |

* cited by examiner

Primary Examiner—Lee Nguyen
Assistant Examiner—Tuan Tran
(74) Attorney, Agent, or Firm—Mayer Brown Rowe & Maw LLP

(57) ABSTRACT

A built-in appliance for a motor vehicle, wherein the appliance is designed as a radio telephone, comprising an introduction orifice for a storage card arranged on a front side of the built-in appliance. The introduction orifice is capable of being closed by a cover which serves at the same time as an operating element. As a result, the available space on the front side is not reduced, as compared with conventional built-in appliances. At the same time, it is easy for a user to extract the storage card which, moreover, is protected against environmental influences by the cover.

20 Claims, 1 Drawing Sheet

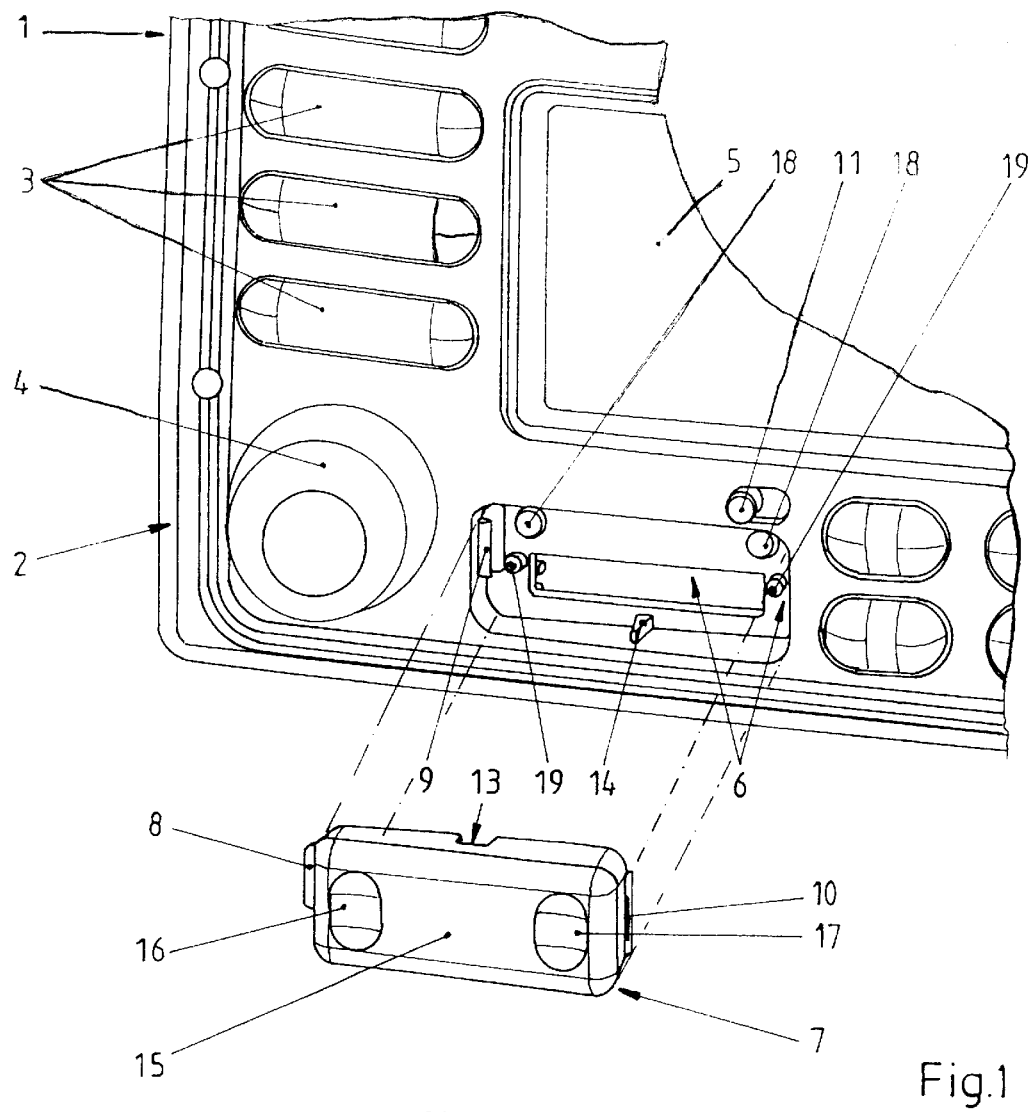
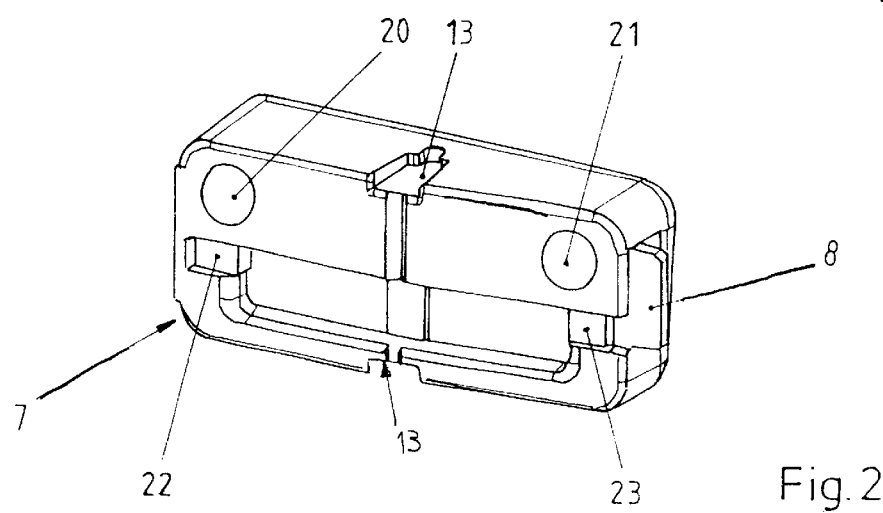
Fig. 1
Fig. 2

BUILT-IN APPLIANCE INTENDED FOR A MOTOR VEHICLE

FIELD OF THE INVENTION

This invention relates generally to a built-in appliance for a motor vehicle, and in particular a motor vehicle radio telephone, with a operating element for actuating a function of the built-in appliance. The built-in appliance also has an introduction orifice designed for the insertion of a storage card into a reading unit of the built-in appliance.

BACKGROUND OF THE INVENTION

On modern motor vehicles, built-in appliances for motor vehicles are inserted into push-in compartments already prepared and standardized for this purpose. In addition to the built-in appliances which are present as standard, individual built-in appliances may also be retro-fitted.

Some built-in appliances have an introduction orifice designed for the insertion of a storage card into a reading unit of the built-in appliance. Essential user-specific data is normally contained on such a storage card. After the storage card has been inserted into the reading unit, the data contained on it can be retrieved by the built-in appliance.

One disadvantage of the built-in appliances of the type mentioned above is that the introduction orifice for inserting the storage card is arranged in a rear housing portion of the built-in appliance. Although the storage card is well protected as a result, in order to exchange it the entire built-in appliance has to be taken out of its fastening. There has already been the idea of arranging the introduction orifice in a front housing portion facing the user, in order thereby to make it possible for the storage card to be exchanged more simply. This solution is not feasible, however, because of the multiplicity of operating and indicating elements of the built-in appliance and on account of the resulting small amount of construction space.

Therefore, there is a need for a built-in appliance that facilitates the insertion of a storage card into the reading unit of the built-in appliance, without losing space for operating elements on the face of the operating unit.

Other needs will become apparent upon a further reading of the following description, taken in conjunction with the drawings.

SUMMARY OF THE INVENTION

In one form of the invention, the aforementioned needs are addressed by an introduction orifice arranged on a front side of the built-in appliance, with the front side facing the user. The introduction orifice is capable of being closed by a cover carrying a operating element.

The present invention thereby allows the introduction orifice to be located on a front side of the built-in appliance facing the user, without losing any operating space on the front side. After the storage card has been introduced or extracted, the introduction orifice is closed by means of the cover. The cover at the same time serves as the carrier of an operating element of the built-in appliance, so that the overall space available for operating elements is not reduced.

With the present invention, the introduction and removal of the storage card is simplified considerably due to easy access on the front side of the built-in appliance, so that the storage card can be inserted and removed without difficulty, which removal can also be used for protection against undesirable use of the built-in appliance. Furthermore, built-in appliances of the present invention can be used, for example, in hired vehicles which constantly have different users, for inserting such different users' individual storage cards into the introduction orifice and having all the data on the storage card immediately retrieved by the built-in appliance. A further benefit of the present invention is that when the introduction orifice is covered by the operating element, it is largely protected against environmental influences. The operating element may also have any desired electric switching elements or buttons and, in addition, indicating units.

The cover may be connected electrically to the built-in appliance by contacting. In contrast, a particularly advantage embodiment of the invention is afforded when the operating element is designed to transmit the mechanical actuating force to a switching point arranged on the built-in appliance.

As a result, only pressure forces are transmitted by the operating element arranged on the cover, while the electric contact point(s) are arranged permanently on the built-in appliance. Electric contacting between the cover and the built-in appliance may therefore be dispensed with, and, as a result, possible faults are prevented and operating reliability is increased. In this case, both rotary and pressure forces can be transmitted, while the cover may also be designed, for example, to be essentially transparent or as a light guide.

The actuating force may be transmitted by the cover to the electrical contact points by means of a tappet or a plunger. A preferred form of the cover is designed as a rocker pivotable for the purpose of transmitting the actuating force. Simple force transmission can thereby be achieved, for which only a few structural elements are needed to ensure the reliable transmission of force. For this purpose, the cover and the operating element may also be designed, in particular, as one integral component. At the same time, jamming when the operating element is positioned carelessly is largely ruled out, so that operating reliability can be further increased.

A particularly advantageous embodiment of the invention is achieved in that the cover is fixed in its position by means of a manually actuable catch connection. As a result, on the one hand, the cover can be fixed in the position of use quickly and without difficulty and, on the other hand, the cover can be removed by merely activating the catch connection. For this purpose, the catch connection may have, for example, a displaceable bolt or a bolt moveable counter to the return force of the spring and be capable of being released by means of pressing actuation or sliding actuation.

Another particularly advantageous development of the invention is afforded in that the cover has an area only slightly larger than that of the introduction orifice to be closed. As a result, the cover can be handled easily and at the same time, due to the compact dimensions, can be carried around without difficulty. Furthermore, the remaining space is restricted only insignificantly, so that, during production, structures which are essentially already present can be reused with only minor adaptations.

A particularly beneficial development of the invention is afforded in that the built-in appliance has a guide making it easier to position the cover, whereby the cover has recesses and the built-in appliance has projections engaging into the latter.

The handling of the cover is thereby made considerably easier. In particular, the guide may have a bevel or chamfer, by means of which the cover is led into the correct position. For fixing, the cover can be laid against the built-in appliance merely on one side and subsequently be fixed by means of a pivoting movement during which the guide at the same time prevents the cover from sliding off the built-in appliance.

The storage card may contain individual user data. A particularly beneficial development of the invention is also achieved when the storage card has a coding necessary to operate the built in appliance. Use of the built-in appliance by unauthorized persons can be effectively prevented as a result, in that the operation of the appliance without the corresponding data contained on the storage card is ruled out. The storage card thus serves at the same time for passive theft protection, so that additional protective measures can be largely dispensed with.

In addition, it is also advantageous if the storage card is necessary for putting the vehicle into operation and thus assumes the function of a vehicle key. At the same time, the card may also serve, for example, as a door key for opening the vehicle doors.

In this case, a particularly beneficial embodiment of the invention is also achieved when the storage card is a network card of a radio telephone network. Since, according to the invention, access to the storage card is rapid, the latter can thus be used in different appliances. For example, by means of the network card, the built-in appliance can be operated as a car telephone during a journey. After the journey, the network card can be inserted into a mobile telephone, so as to provide virtually uninterrupted reachability and a flexible use of the network card.

Another particularly advantageous embodiment of the invention is that the built-in appliance has a writing unit for storing data on the storage card. As a result, data changes occurring while the built-in appliance is operating can be filed on the storage card, in order thereby to be retrievable at a later time, for example even when the storage card is used in another appliance.

The cover may, in principle, be removable completely or else, for example, be connected moveably to the built-in appliance by means of a joint. Other embodiments with displaceable covers are just as possible as large-area covers which, in this regard, cover, for example, the entire front side of the built-in appliance. Furthermore, a light source capable of being shielded by the cover can make positioning easier and, at the same time, indicate the absence of the storage card or of the cover.

BRIEF DESCRIPTION OF THE DRAWINGS

FIG. 1 shows a front view of a built-in appliance according to the invention and of a cover; and FIG. 2 shows a rear view of the cover shown in FIG. 1.

DETAILED DESCRIPTION

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated and described herein.

FIG. 1 shows a perspective front view of a built-in appliance designed as a car radio. The built-in appliance 1 has a front side 2 with a plurality of actuating elements 3, and also a rotary switch 4 and a display 5. The built-in appliance 1 has, furthermore, an introduction orifice 6 for introducing a storage card which is not illustrated. This introduction orifice 6 is capable of being closed by means of a cover 7. The cover 7 has, for this purpose, a projection 8 which, for fixing the cover 7, first engages behind a catch nose 9 of the built-in appliance 1. Subsequently, a catch face 10 located opposite the projection 8 is fixed. For this purpose, a moveable catch means, not illustrated, connected to an actuating element 11 engages into the catch face 10. The catch face 10 and the catch means, not illustrated, together form a catch connection, not illustrated. To make the fixing operation easier, the cover 7 includes two recesses 13 which are designed as a pivoting faces and into which two wedge-shaped projections 14 of the built-in appliance 1 engage and thereby prevent the cover 7 from sliding off the built-in appliance. The cover 7 serves at the same time as the carrier for an operating element 15 which has two pushbuttons 16, 17. The pushbuttons 16, 17 make it possible for the actuating force exerted manually on the operating element 15 to be transmitted in each case to a switching point 18 of the built-in appliance 1. The cover 7 acts, in this case, as a button rocker which is pivotable about the contact region between the front end of the wedge-shaped projections 14 and the rear end (with semicircular recesses, FIG. 2) of the recesses 13.

Electric contacting therefore takes place inside the built-in appliance 1, so that an operating fault, for example a short circuit within the cover 7 through improper handling, can be prevented. Furthermore, two contact pins 19 also allow direct electric contacting of the cover 7 with the built-in appliance 1.

FIG. 2 shows a perspective illustration, enlarged in relation to FIG. 1, of the rear side of the cover 7 shown in FIG. 1. The projection 8 and the recesses 13, which, for fixing the cover 7, have a shape making the pivoting movement easier, can be seen. Moreover, the cover 7 has two bores 20, 21, into which the switching point 18 shown in FIG. 1 engages in each case in the operating state and thus allows the actuating force to be transmitted. The cover 7 has, furthermore, two contact faces 22, 23 for the contact pins 19 illustrated in FIG. 1. As a result of the electric contacting which has taken place in this way, it is also possible, for example, to provide the cover 7 with an individual coding, in order to prevent the built-in appliance 1 from being put into operation without the associated cover 7 and thereby to achieve passive theft protection for the built-in appliance 1.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A built-in appliance for a motor vehicle, comprising an operating element for actuating a function of the built-in appliance, and an introduction orifice designed for the insertion of a storage card into a reading unit of the built-in appliance, wherein the introduction orifice is arranged on a front side of the built-in appliance, said front side facing the user, wherein said introduction orifice is capable of being closed by a cover carrying the operating element, and wherein said cover conceals only a portion of the whole of the front side of the built in appliance.

2. The built-in appliance as claimed in claim 1, wherein the operating element is designed for transmitting mechanical actuating force to a switching point arranged on the built-in appliance.

3. The built-in appliance according to claim 1, wherein the cover is designed as a rocker pivotable for the purpose of transmitting an actuating force.

4. The built-in appliance as claimed in claim 1, wherein the cover is fixed in its position by means of a manually actuable catch connection.

5. The built-in appliance as claimed in claim 1, wherein the cover has an area slightly larger than that of the introduction orifice.

6. The built-in appliance as claimed in claim 1, wherein the cover includes at least one recess and the built-in appliance includes at least one projection engaging into the latter.

7. The built-in appliance as claimed in claim 1, wherein the storage card has a coding that is necessary for operating the built-in appliance.

8. The built-in appliance as claimed in claim 1, wherein the storage card is a network card of a radio telephone network.

9. The built-in appliance as claimed in claim 1, wherein the built-in appliance further comprises a writing unit for storing data on the storage card.

10. A built-in appliance for a motor vehicle comprising:
   a first portion of said appliance, wherein said first portion is fixedly attached to said vehicle;
   an introduction orifice in said first portion through which a storage card may be inserted, said introduction orifice being located on a side of said first portion facing a user; and
   a second portion of said appliance attached to said first portion, wherein said second portion substantially covers said introduction orifice said second portion comprises an operating element for said built-in appliance, and said second portion covers only a portion of the whole of the first portion of the built-in appliance.

11. The appliance as claimed in claim 10, wherein said second portion transmits a mechanical actuating force to a switching point on said first portion.

12. The appliance as claimed in claim 10, wherein said second portion comprises a pivotal rocker switch.

13. The appliance as claimed in claim 10, wherein said second portion is removably attached by a manually actuable catch connection.

14. The appliance as claimed in claim 10, wherein said second portion has at least one recess that is enageable with at least one projection on said first portion.

15. The appliance as claimed in claim 10, wherein said storage card has a coding necessary for operating the built-in appliance.

16. The appliance as claimed in claim 10, wherein said storage card is a network card for a radio telephone network.

17. The appliance as claimed in claim 10, wherein said second portion is removably attached to said first portion.

18. The appliance as claimed in claim 10, wherein said first portion further comprises a writing unit for storing data on the storage card and a reading unit for reading data on the storage card.

19. A built-in appliance for a motor vehicle comprising:
   a first portion of said appliance, wherein said first portion is fixedly attached to said vehicle;
   an introduction orifice in said first portion through which a storage card may be inserted, said introduction orifice being located on a side of said first portion facing a user;
   a second portion of said appliance removably attached to said first portion by a manually actuable catch connection, wherein said second portion substantially covers said introduction orifice and said second portion comprises an operating element for said built-in appliance, wherein said second portion transmits a mechanical actuating force to a switching point on the first portion, and wherein and said second portion covers only a portion of the whole of the first portion of the built-in appliance.

20. The appliance as claimed in claim 19, wherein said storage card has coding necessary for the operation of the built-in appliance and said storage card is a network card, and wherein the built-in appliance further comprises a writing unit for storing data on said storage card and a reading unit for reading data on said data card.

* * * * *